United States Patent [19]

Hamamura

[11] Patent Number: 4,986,873
[45] Date of Patent: Jan. 22, 1991

[54] THIN-FILM COATING APPARATUS

[75] Inventor: Fumio Hamamura, Kanagawa, Japan

[73] Assignee: Somar Corporation, Tokyo, Japan

[21] Appl. No.: 302,884

[22] Filed: Jan. 30, 1989

[30] Foreign Application Priority Data

Jan. 30, 1988 [JP] Japan .................................. 63-20013

[51] Int. Cl.[5] ........................................... B32B 31/10
[52] U.S. Cl. ..................................... 156/552; 156/521;
156/522; 118/216; 118/227; 118/249; 118/258; 118/259
[58] Field of Search ........................ 156/522, 552, 521;
427/428, 429; 118/224, 259, 244, 249, 258, 216, 227

[56] References Cited

U.S. PATENT DOCUMENTS

| 3,991,708 | 11/1976 | Huebschmann | 118/258 |
|---|---|---|---|
| 4,079,694 | 3/1978 | Galinou | 118/259 |
| 4,338,152 | 7/1982 | DelBianco et al. | 156/552 |
| 4,378,264 | 3/1983 | Pilette et al. | 156/249 |
| 4,405,394 | 9/1983 | Cohen | 156/308.8 |
| 4,495,014 | 1/1985 | Gerbrian et al. | 156/80 |
| 4,585,509 | 4/1986 | Obayashi | 156/497 |
| 4,605,454 | 8/1986 | Sayovitz et al. | 156/73.1 |
| 4,653,303 | 3/1987 | Richard | 118/259 |
| 4,828,247 | 5/1989 | Matsuo et al. | 156/521 |
| 4,844,772 | 7/1989 | Sumi et al. | 156/497 |

FOREIGN PATENT DOCUMENTS 0041642 12/1981 European Pat. Off. .
3023114 1/1981 Fed. Rep. of Germany .

OTHER PUBLICATIONS

European Patent Office Search Report dated May 10, 1990.
2244 Research Disclosure (1987) May, No. 277, New York, N.Y., (U.S.A.) Apparatus for Uniform Application of Coating Material.

Primary Examiner—Caleb Weston
Attorney, Agent, or Firm—Sughrue, Mion, Zinn, Macpeak & Seas

[57] ABSTRACT

A thin-film coating apparatus for coating a surface of a substrate with a thin film wherein the creation of void spaces can be prevented on the contacting surfaces between the laminated film and the electrically conductive layer formed on a substrate. The apparatus includes wet rollers which are arranged along the substrate conveyace path prior to a tacking position where the thin-films are temporarily tacked to the substrate. The wet rollers deposit a void preventing agent on the substrate so as to provide a secure lamination. So as to insure that the agent will be supplied to the wet rollers, the apparatus includes supply pipes, flexible dams, means for supplying the agent to the supply pipes and a plurality of holes formed in the supply pipes.

2 Claims, 5 Drawing Sheets

THIN-FILM COATING APPARATUS

BACKGROUND OF THE INVENTION

The present invention relates to a thin-film coating apparatus and, more particularly, relates to a thin-film coating apparatus which coats a surface of a substrate with a thin film.

Generally, printed circuit boards used in electronic appliances, such as computers or the like, are provided by forming a patterned wiring of copper or the like on one side or opposite sides of an insulating substrate.

Printed circuit boards of this type can be produced by the following manufacturing process.

First, a lamination composed of a light-sensitive resin (photoresist) layer and a light-transmissive resin film (protective layer) for protecting the light-sensitive resin layer is laminated by thermocompression-bonding onto an electrically conductive layer (copper thin film) provided on an insulating substrate. The thermocompression-bonding lamination is mass-produced by a thin-film coating apparatus called a "laminator". After thermocompression-bonding lamination, a wiring pattern film is overlapped on the lamination and the light-sensitive resin layer is exposed to light for a predetermined period of time through the wiring pattern film and the transmissive resin film. After the transmissive resin film is parted from the substrate by a film removing apparatus, the exposed light-sensitive resin layer is developed to form an etching mask pattern. After development, the unnecessary portion of the electrically conductive layer is removed by etching and then the residual part of the light-sensitive resin layer is removed, so that a printed circuit board having a predetermined wiring pattern is prepared.

As described above, according to the conventional thin-film coating apparatus, a lamination composed of a light-sensitive resin (photoresist) layer and a light-transmissive resin film (protective layer) is thermocompression-bonded onto an electrically conductive layer (copper thin film) provided on an insulating substrate. However, the surface of the electrically conductive layer has a slight surface roughness, such that air pockets are formed on the slightly uneven surface of the electrically conductive layer when laminated with the laminated film. Thus, void spaces occur at the contacting surface between the electrically conductive layer and the lamination. Accordingly, the conventional thin-film coating apparatus has a problem in that the adhesion between the electrically conductive layer and the lamination deteriorates, causing a further problem in that the reliability on the wiring of the printed circuit board is lowered.

OBJECTS AND SUMMARY OF THE INVENTION

The present invention has been attained to solve the aforementioned problem.

It is therefore an object of the present invention to provide a thin-film coating apparatus by which the reliability of a substrate coated with a thin film can be improved.

It is another object of the invention to provide an apparatus by which the reliability of a printed circuit board can be improved.

It is also an object of the invention to provide an apparatus by which the creation of voids can be prevented from occuring on a contacting surface between a laminated film and an electrically conductive layer (copper layer) formed on a substrate.

The foregoing and other objects and features of the present invention will be apparent from the following specification and accompanying drawings.

Briefly, the fundamental aspects of the invention disclosed in this specification are as follows:

The present invention provides a thin-film coating apparatus in which tack members are moved respectively near opposite surfaces of a conveyance-direction forward end portion of an insulating substrate to temporarily tack feeding-direction forward end portions of thin films thereto. Compression rollers are placed against the forward end portions of the tacked thin films in the tacking position after the tack members have been respectively removed from the surfaces of the substrate. Thereafter, the compression rollers are rotated to convey the substrate and stick the thin films to the surfaces of the substrate. The invention is characterized in that the apparatus comprises: wet rollers arranged on a frame of a substrate-conveyance path means at a position prior to the tacking position to which the substrate is to be conveyed for the purpose of depositing a void preventing agent to the substrate; void preventing agent supply pipes arranged in parallel to the wet rollers; flexible dams arranged under the void preventing agent supply pipes so as to be in contact with lower portions of the pipes; means for supplying the void preventing agent to the void preventing agent supply pipes; and a plurality of void preventing agent supply holes formed in the void preventing agent supply pipes, the holes being arranged in the longitudinal direction of the pipes.

Having such a structure as described above, the apparatus is advantageous in that the void preventing agent is supplied entirely over the wet rollers so as to be deposited on the substrate before the substrate is conveyed to the tacking position to thereby make it possible that not only the thin films can be quickly adhered to the surfaces of the electrically conductive layers but also voids can be prevented from occurring on the contacting surface between the electrically conductive layer and the thin film.

Accordingly, the adhesion between the electrically conductive layer and the lamination film can be improved and, at the same time, reliability on the wiring of the printed circuit board can be improved.

DETAILED DESCRIPTION OF THE PREFERRED EMBODIMENTS

An embodiment of the present invention, which is applied to a thin-film coating apparatus for coating a printed circuit board with a lamination film composed of a light-sensitive resin layer and a light-transmission resin film by thermocompression-bonding, will be described in detail with reference to the drawings. Items having the same function are correspondingly referenced throughout the drawings and repeated description of those items are omitted.

Figure 1:
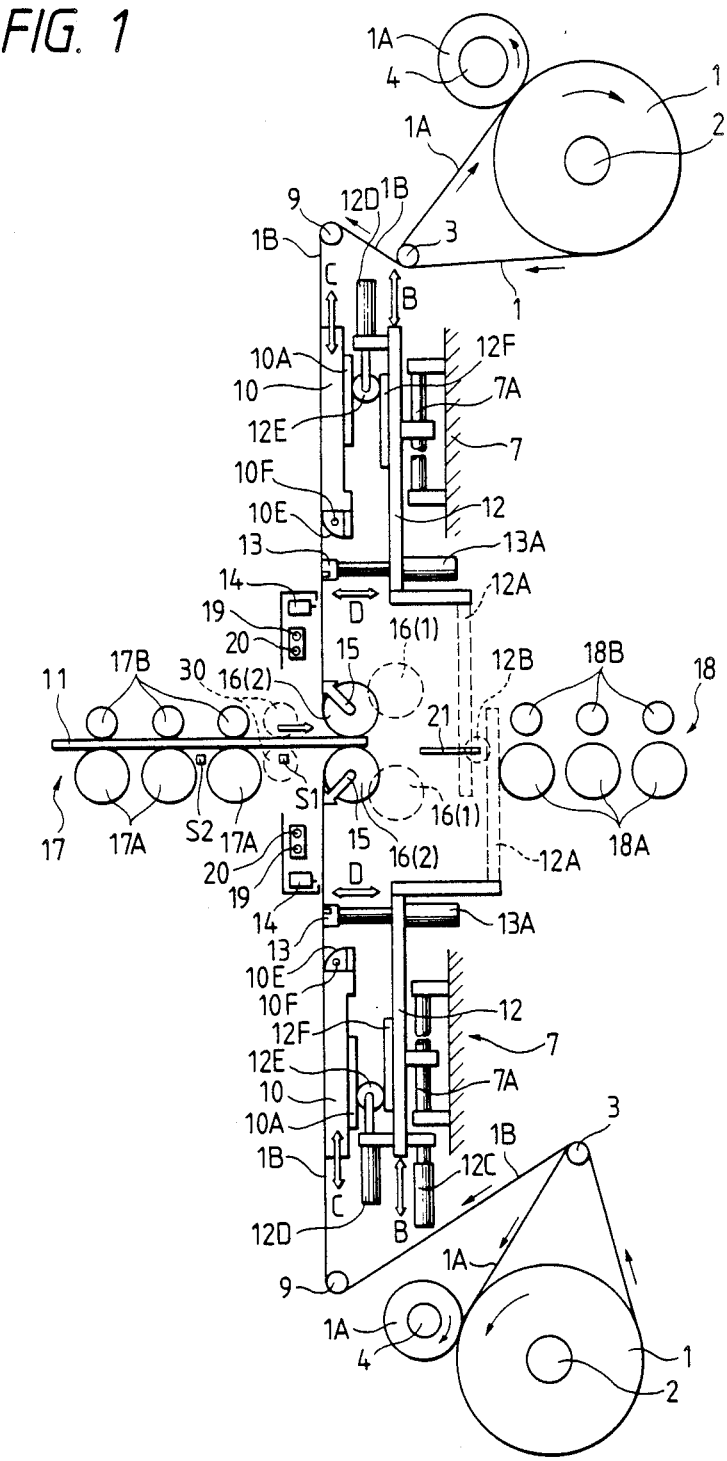
FIG. 1 is a schematic diagram of a thin-film coating apparatus as one embodiment of the present invention.

The thin-film coating apparatus of the invention is shown in FIG. 1. As shown in FIG. 1, laminations 1 respectively having a three-layer structure constituted by a light-transmissive resin film, a light-sensitive resin layer and a light-transmissive resin layer are continuously wound on feed rollers 2. By means of thin-film separating rollers 3, each of the laminated films 1 on the feed rollers 2 is separated into two parts, that is, a light-transmissive resin film (protective film) 1A and a lamination 1B composed of a light-transmissive resin film and a light-sensitive resin layer having one side (the adhesive surface) exposed. The separated light-transmission resin films 1A are wound on takeup rollers 4.

Figure 2:
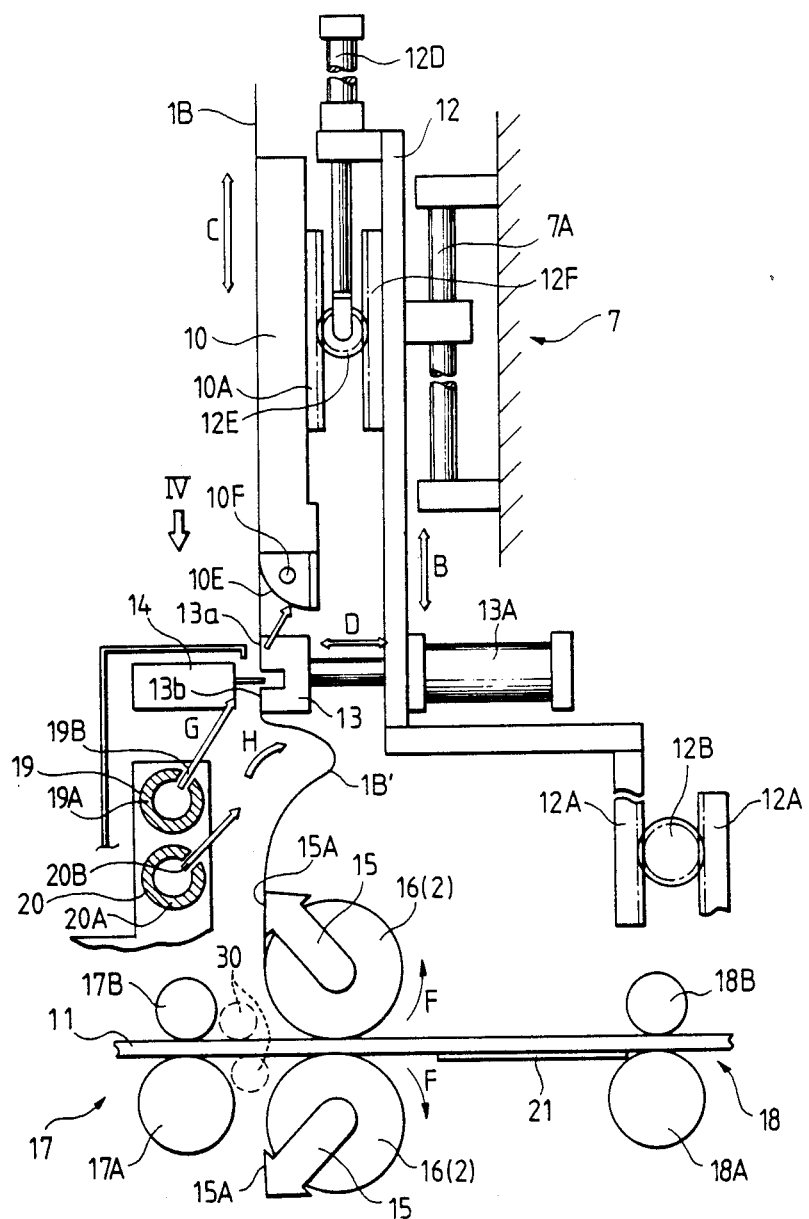
FIG. 2 is a partly enlarged diagram through FIG. 1.

The feeding-direction forward ends of the films 1B separated by the thin-film separating rollers 3 are arranged to be vacuum-secured to main vacuum plates 10 through tension rollers 9 as shown in FIGS. 1 and 2.

Each of the tension rollers 9 is arranged to impact moderate tension to the lamination 1B between the feed roller 2 and the main vacuum plate 10. In other words, each of the tension rollers 9 is arranged to prevent the lamination 1B from creasing.

The main vacuum plates (thin-film feed members) 10 are arranged to feed the laminations 1B from the feed rollers 2 onto the electrically conductive layers (for example, copper film layer) of an insulating substrate 11. The main vacuum plates 10 are provided on supporting members 12 which move close to and far from the insulating substrate 11 in the directions of arrows B as shown in FIGS. 1 and 2. The supporting members 12 are provided on an apparatus body (the box-like body of the thin-film coating apparatus) 7 via guide members 7A which allow for sliding in the directions of the arrow B. The supporting members 12 are arranged in two (upper and lower) positions which are opposite to each other with respect to the conveyance path of the insulating substrate 11. The upper-side supporting member 12 and the lower-side supporting member 12 are linked by a rack-and-pinion mechanism so that the two supporting members 12 can be simultaneously moved near or far from the insulating substrate 11. In other words, the pair of supporting members 12 are linked to each other by respective racks 12A and a pinion 12B engaged with the racks 12A. The operation of the supporting members 12 is carried out via a driving source 12C provided at the lower-side supporting member 12. For example, the driving source 12C may be formed of an air cylinder. The driving source 12C can also be an oil cylinder, an electromagnetic cylinder, a stepping motor or other transmission mechanisms for transmitting displacement to the supporting members 12.

The main vacuum plates 10 are provided on the supporting members 12 so that the plates 10 can be moved near to and far from the insulating substrate 11 (in the directions of the arrows C) independent of the movement of the supporting members 12. The main vacuum plates 10 are operated by rack-and-pinion mechanisms and driving sources 12D provided on each of the supporting members 12. Each of the rack-and-pinion mechanisms is composed of a pinion 12E provided on the driving source 12D, a rack 12F provided on the supporting member 12, and a rack 10A provided on the main vacuum plate 10. Each of the driving sources 12D may be formed of the same component as the driving source 12C.

For example, each of the driving sources 12C and 12D may be formed of an air cylinder and controlled by an electromagnetic valve.

Each of the main vacuum plates is provided with a plurality of suction holes (not shown), by which the lamination 1B can be attracted and held. The holes are connected to a vacuum source such as a vacuum pump through an exhaust pipe. The operation of the main vacuum plates are controlled independently of the suction operation of tack portions 10E.

The tack portions 10E respectively have a side formed as an arc at which the lamination 1B is held. The tack portions 10E are located at the forward ends of the main vacuum plates 10 in the direction of feeding the lamination 1B and are united to the main vacuum plates 10, respectively. As shown in FIGS. 1 and 2, heaters 10F for heating the arc-like sides of the tack portions are installed thereof. The tack portions 10E are constructed so that the forward ends of the laminations 1B fed by the main vacuum plates 10 can be temporarily tacked onto the electrically conductive layers of the insulating substrate 11.

Although this embodiment is directed to the case where the tack portions 10E are united to the main vacuum plates 10, it is a matter of course that the invention is not limited thereto and that the main vacuum plates 10 and the tack portions 10E, independent of the main vacuum plates 10, may be provided to the supporting members 12.

Sub-vacuum plates (thin-film preserving members) 13 are provided near the tack portions 10E, that is, near the feeding path of the laminations 1B and between each tack portion 10E and the insulating substrate 11. Each of the sub-vacuum plates 13 is provided with suction holes. As shown in FIG. 2, each of the sub-vacuum plates 13 has an upper adsorptive portion 13A and a lower adsorptive portion 13B and is U-shaped (the U-shaped portion corresponds to a position where the lamination film 1B is cut). The upper adsorptive portion 13A of the sub-vacuum plate 13 is arranged to attract the feeding-direction forward end of the lamination film 1B and hold it on the tack portion 10E. The sub-vacuum plate 13 is mounted to the supporting member 12 through a driving source 13A, such as an air cylinder, which can move near and far from the feeding path of the lamination film 1B (in the directions of the arrow D) so that the forward end of the lamination film 1B can be attracted to the tack portion 10E.

On the other hand, the lower adsorptive portion 13B of the sub-vacuum plate 13 is arranged to attract the backward end of the lamination film 1B cut from the continuous lamination 1B by a cutter 14 and retain it in the feeding path of the lamination 1B. The lower adsorptive portion 13B is arranged to slacken the lamination 1B (or in other words form the slackened lamination 1B') as shown in FIG. 2 between a rotary vacuum plate 15 and itself after the start of thermocompression-bonding lamination. The slackened lamination 1B' can be formed by controlling the main vacuum plate 10 to increase the feeding speed of the lamination 1B relative to the circumferential speed (thermocompression-bonding lamination speed) of a thermocompression-bonding roller 16. The speed control of the main vacuum plate 10 and the thermocompression-bonding roller 16 is carried out by a sequence control circuit (not shown).

Although this embodiment describes the case where the driving source 13A of the sub-vacuum plate 13 is formed of an air cylinder, it is a matter of course that the plate may be formed of another component such as an oil cylinder, in the same manner as described above for the driving source 12C.

Each of the cutters 14 is fixed to the apparatus body 7 in the vicinity of the feeding path of the lamination 1B between the tack portion 10E and the insulating substrate 11 (that is, between the tack portion 10E and the rotary vacuum plate 15). Specifically, each of the cutters 14 is opposing the sub-vacuum plate 13 when the backward end of the lamination 1B is fed to the cutting position. Each of the cutters 14 is disposed on a side of a preceding-stage conveyer 17 which is provided to convey the insulating substrate 11 (or the cutter 14 may be arranged directly to the preceding-stage conveyer 17). Each of the cutters 14 is arranged so that the lamination 1B continuously fed by the main vacuum plate 10 can be cut into a predetermined length corresponding to the size of the insulating substrate 11.

As shown in FIGS. 1 and 2, the laminations 1B, in which the forward ends are temporarily tacked on the electrically conductive layers of the insulating substrate 11 in the tacking portions 10E of the main vacuum plates 10, arranged so that thermocompression-bonding lamination on the whole thereof can be carried out by the thermocompression-bonding rollers 16, respectively. Each of the thermocompression-bonding rollers 16 is placed in a standby position shown by the dotted line in FIG. 1 during the tacking operation in which the forward ends of the laminations 1B are tacked in the tacking portions 10E. In the standby position, the thermocompression-bonding rollers 16(1) do not contact the tacking portions 10E when the tacking portions 10E are in the tacking position during the tacking operation. After the tacking operation, the thermocompression-bonding rollers 16 are moved from the standby position 16(1), shown by the dotted line, to the tacking position 16(2), shown by the solid line. In the tacking position, the thermocompression-bonding rollers 16(2) nip the insulating substrate 11 through the laminations 1B disposed therebetween.

The backward ends of the laminations 1B cut by the cutters 14 are guided by the triangular rotary vacuum plates 15 so as not to wrinkle during the thermocompression-bonding lamination by the thermocompression-bonding rollers 16. Each of the rotary vacuum plates 15 is arranged to be coaxially supported on the same shaft as that of the corresponding thermocompression-bonding roller 16 and be rotated around the shaft. A plurality of suction holes 15A (not shown) are provided on the adsorptive surfaces of the rotary vacuum plates 15 opposite to the laminations 1B, respectively. Each of the adsorptive surfaces having the plurality of suction holes 15A has the same structure as that of the adsorptive surface in each of the main vacuum plates 10. Suction holes (not shown) may be further provided on the upper surfaces of the rotary vacuum plates 15 to make it easier to create the slackened lamination films 1B'.

As shown in FIGS. 1 and 2, the insulating substrate 11 is conveyed to the lamination-film 1B tacking position of the thin-film coating apparatus by the preceding-stage conveyer 17 constituted by driving conveyance-rollers (lower stage) 17A and floating conveyance-rollers (upper stage) 17B.

Figure 3:
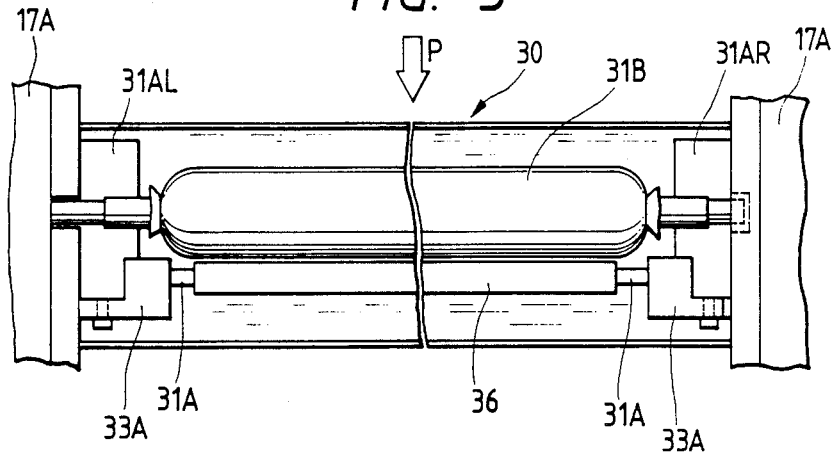
FIG. 3 is a plan view seen from above, of wet rollers and water supply pipes of the void preventing unit depicted in FIG. 1.
Figure 4:
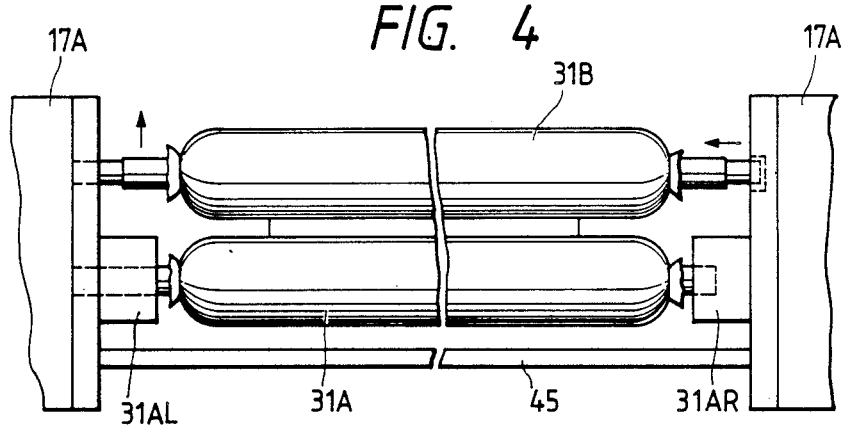
FIG. 4 is a plan view seen from the direction of the arrow P of FIG. 3.
Figure 5:
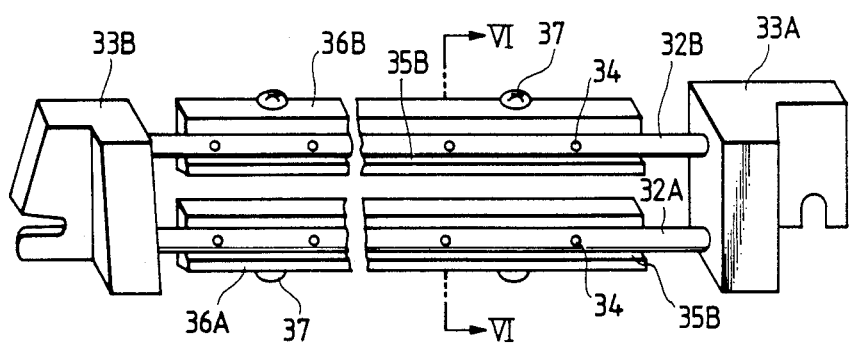
FIG. 5 is a perspective view showing the schematic arrangement of the water supply pipes and dams depicted in FIG. 3.
Figure 6:
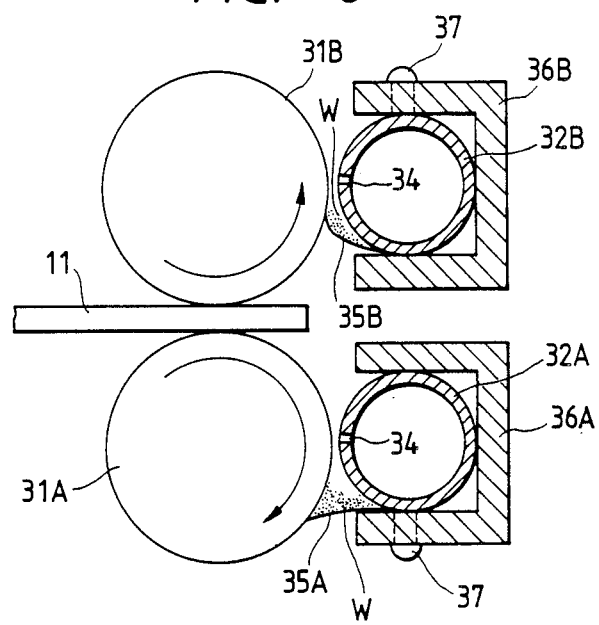
FIG. 6 is a sectional view taken along the line VI—VI of FIG. 5.

A void-preventing-agent depositing wet roller unit 30 is provided on the preceding-stage conveyer 17 for depositing water (void preventing agent) on the substrate 11 before the substrate 11 is conveyed to the tacking position. The void-preventing-agent depositing wet roller unit 30 is arranged so that wet rollers 31A and 31B are rotatably mounted on a frame 17A of the preceding-stage conveyer 17 in the preceding stage of the thermocompression rollers 16(2) as shown in FIGS. 3 and 4. The wet roller 31A is connected through a support 31AL to the same driving source as the conveyance rollers 17A so as to be rotatable in synchronism therewith. The wet roller 31B, which is floating, is made detachable through a support 31AR. Each of the wet rollers 31A and 31B is formed by winding a water-absorbent sheet, such as cloth, sponge and the like, on a cylindrical body. As shown in FIGS. 3 and 5, water supply pipes 32A and 32B are provided near the wet rollers 31A and 31B, respectively. The water supply pipes 32A and 32B are supported by supporting members 33A and 33B which are detachably mounted through engagement mechanisms to the supports 31A and 31B attached to the frame 17A of the preceding-stage conveyer 17. Each water supply pipe 32A and 32B is provided with a plurality of water supply holes 34 aligned longitudinally at predetermined intervals. To supply water uniformly to the wet rollers 31A and 31B, dams 35A and 35B are detachably provided on the lower portions of the water supply pipes 32A and 32B through fixing members 36A and 36B, U-shaped in section, respectively, by a plurality of screws 37. The dams 35A and 35B are formed from a flexible sheet having moderate hardness, such as synthetic resin, or the like. The dams 35A and 35B contact the wet rollers 31A and 31B, respectively. That is, the dams 35A and 35B are arranged to be flexible so as to continuously contact the wet rollers 31A and 31B during rotation thereof as shown in FIG. 6. When worn out, the dams 35A and 35B can be replaced by loosening the screws 37.

As described above, the dams 35A and 35B are secured to the lower portions of the water supply pipes 32A and 32B so that the water W supplied from the water supply holes 34 of the water supply pipes 32A and 32B is preserved and substantially uniformly applied.

Figure 7:
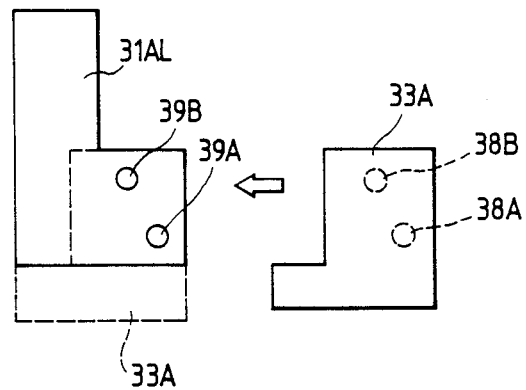
FIG. 7 is a plan view for explaining parts for feeding water to the water supply pipes depicted in FIG. 5.

As shown in FIG. 7, water supply holes 38A and 38B are provided in the supporting member 33A of the water supply pipes 32A and 32B. The water supply holes 38A and 38B communicate with the water supply pipes 32A and 32B, respectively. The water supply holes 38A and 38B also communicate with water supply holes 39A and 39B formed in the support 31AL when the supporting members 33A and 33B are set on the supports 31AL and 31AR, respectively, attached to the frame 17A of the preceding-stage conveyer 17.

Figure 8:
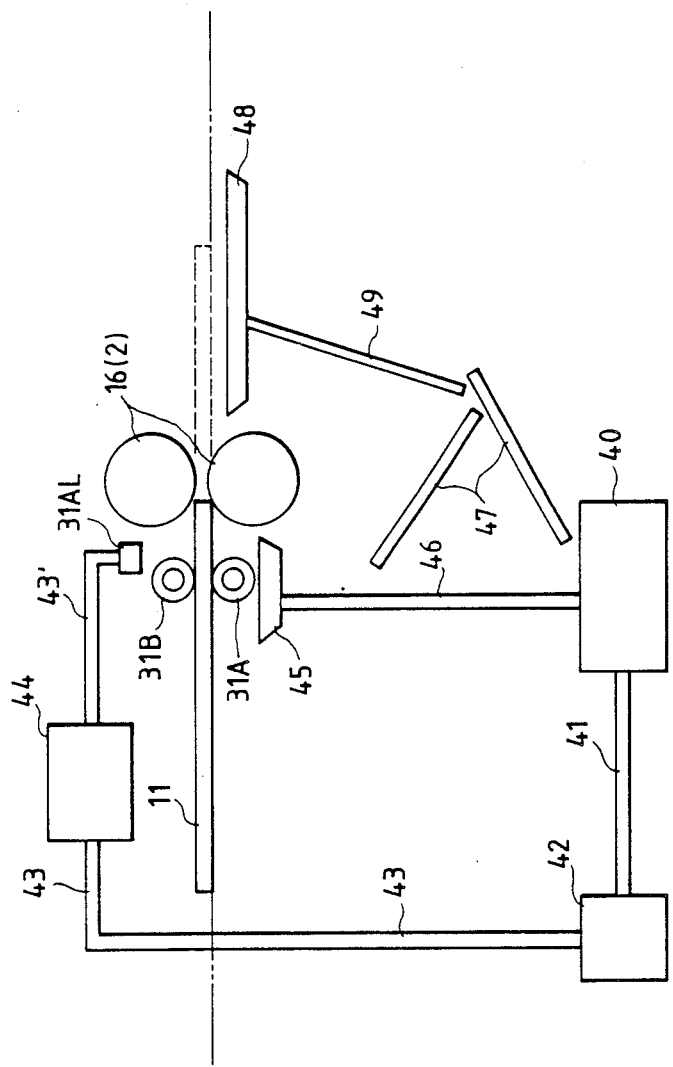
FIG. 8 is a block diagram for explaining the schematic arrangement of the void preventing unit depicted in FIG. 1.

As shown in FIG. 8, a suitable quantity of water is supplied to each of the water supply holes 39A and 39B, via a water tank 40, a water supply hose 41, a water supply pump 42, a water supply hose 43, a filter 44 for removing impurities, and a water supply hose 43'.

The wet rollers 31A and 31B are rotated by the conveyance of the substrate 11 so that water is applied to the surfaces of the substrate 11. The remainder of water is received by a water saucer 45 and fed back to the water tank 40 through an exhaust hose 46. On the other hand, water removed when the laminations 1B' are adhered to the substrate 11 by the thermocompression-bonding rollers 16(2) is received by a water shoot 47 and fed back to the water tank 40. Further, water deposited on the substrate 11 having the laminations 1B' stuck thereon is received by a water saucer 48 and fed back to the water tank 40 through an exhaust hose 49. The water saucer 48 and the exhaust hose 49 used herein may be replaced by a suction roller, dryer or the like.

As described above, the void-preventing-agent such as water is deposited onto the substrate 11 by the wet rollers 31A and 31B of the void-preventing-agent depositing wet roller unit 30 before the substrate 11 and laminations 1B' are conveyed to the tacking position. Thereafter, the tacking portions 10E are respectively placed against the opposite surfaces of the conveyance-direction forward end portion of the substrate 11 so that the feeding-direction forward end portions of the lamination films 1B' are tacked thereto. The thermocompression-bonding rollers 16(2) are then placed against the forward end portions of the tacked laminations 1B' in the tacking position after the tacking portions 10E are respectively removed from the surfaces of the substrate 11. Subsequently, the thermocompression-bonding rollers 16(2) are rotated to convey the substrate 11 and adhere the laminations 1B' to the surfaces of the substrate 11. The water W remaining on the slightly uneven surfaces of the electrically conductive layers of the substrate 11 laminated with the lamination film 1B' removes voids and dissolves the photoresist (in the case of water-soluble light-sensitive resin of the lamination film 1B') so as to serve as an adhesive agent. Accordingly, the laminations 1B' come in close contact with the surfaces of the electrically conductive layers so that voids can be prevented from occurring on the contacting surface between the electrically conductive layer and the lamination film.

Accordingly, the adhesion between the substrate 11 and the lamination 1B' can be improved and, at the same time, reliability on the wiring of the printed circuit board can be improved.

Preferably, water-soluble type material is used as the photoresist (light-sensitive resin) of the lamination 1B. Further, a surface tension adjusting agent, a copper surface adhesive agent and the like may be added to water to be used as a void-preventing-agent depositing agent.

In the preceding-stage conveyer 17, a sensor S1 for detecting the position of the conveyance-direction forward end portion of the insulating substrate 11 is arranged in the vicinity (position for detecting the forward end portion of the substrate) of the substrate-conveyance path prior to the tacking position. The sensor S1 is constructed so that a detection signal for starting the operation of a preset counter of a microcomputer (CPU) is generated when the conveyance-direction forward end portion of the insulating substrate 11 is detected. The preset counter is constructed so that a control signal for stopping the conveyance-direction forward end portion of the substrate 11 in the tacking position is generated when a predetermined time has expired. For example, the sensor S1 is formed of a photoelectric switch.

Further in the preceding-stage conveyer 17, a sensor S2 for detecting the position of the conveyance-direction backward end portion of the insulating substrate 11 is arranged in the vicinity of the substrate-conveyance path prior to the sensor S1, that is, in the position for detecting the backward end portion of the substrate. The sensor S2 is constructed in the same manner as the sensor S1 so that a detection signal for starting the operation of another preset counter of the microcomputer (CPU) is generated when the conveyance-direction backward end portion of the insulating substrate 11 is detected. The preset counter is constructed so that a control signal for forming the slack 1B' of the laminations 1B in the feeding-direction backward end portions, cutting the lamination films 1B at the cutting positions by the cutters 14 and sticking the feeding-direction backward end portions of the thus cut lamination films 1B to the insulating substrate 11 by thermocompression-bonding lamination is generated when a predetermined time expires. Further, the preset counter is provided to generate a control signal for moving the thermocompression-bonding rollers 16 from the tacking position to the vicinity of the standby position, as well as for adhering the feeding-direction backward end portions of the laminations 1B to the insulating substrate 11 by thermocompression-bonding lamination. For example, the sensor S2 is formed of a photoelectric switch in the same manner as the sensor S1.

On the other hand, a succeeding-stage conveyer 18 composed of conveyance rollers (lower side) 18A and conveyance rollers (upper side) 18B is constructed so that the insulating substrate 11 having the laminations 1B adhered can be conveyed to an exposure apparatus in which a wiring pattern is formed.

As shown in FIGS. 1 and 2, thin-film correcting units 19 are provided on the apparatus body 7 (or preceding-stage conveyer 17, or supporting members 12) in the vicinity of the thin-film feeding path of the tacking portions 10E of the main vacuum plates 10. The thin-film correcting units 19 adjust the feeding-direction forward end portions of the laminations 1B in the directions of the arrow G such that the forward end portions of the lamination films 1B can be brought into close contact with the tacking portions 10E. Each of the thin-film correcting units 19 is composed of a fluid pipe 19A extending along the width of the lamination 1B, and a plurality of fluid blowing holes 19B provided to the fluid pipe 19A.

The fluid pipe 19A is hollow and passes fluid having pressure higher than the ordinary pressure. Although this embodiment has shown the case where the fluid pipe 19A is substantially circularly shaped in section, the invention is not limited to the specific embodiment and the fluid pipe 19A may be shaped quadrangularly or elliptically in section.

The fluid blowing holes 19B are arranged to blow fluid in such a direction that the laminations 1B can be corrected. Although air is used as the fluid used in the thin-film correcting units 19, air may be replaced by any other gas such as an inert gas or the like or may be replaced by a liquid such as water, oil or the like.

As shown in FIGS. 1 and 2, thin-film projecting units 20 are secured to the apparatus body 7 (or preceding-stage conveyer 17, or supporting members 12) in the vicinity of the corresponding lamination 1B' fed between the lower adsorptive portion 13b of the sub-vacuum plate 13. The thin-film projecting units 20 are arranged to direct the slackened laminations 1B' in the direction of the arrow H such that the laminations film 1B can be brought into close contact with the thermocompression-bonding rollers 16. Each of the thin-film projecting units 19 is composed of a fluid pipe 20A extending along the feeding-direction width of the lamination film 1B, and having a plurality of fluid blowing holes 20B.

The fluid pipe 20A is hollow and passes fluid having pressure higher than than the ordinary pressure. Although this embodiment describes the case where the fluid pipe 20A is substantially circularly shaped in section, it is a matter of course that the invention is not limited to the specific embodiment and that the fluid pipe 20A may be shaped quadrangularly or elliptically in section in the same manner as the fluid pipe 19A.

The fluid blowing holes 20B are arranged to blow fluid in such a direction that the slack of the lamination film 1B' can be projected as described above.

Although air is used as the fluid in the thin-film projecting units 20 in the same manner as in the thin-film correcting units 19, air may be replaced by any other gas such as an inert gas, or the like, or may be replaced by a liquid such as water, oil or the like.

Further, the invention is applicable to the case where the thin-film correcting units 19 or thin-film projecting units 20 may be composed of a plurality of fluid spraying nozzles arranged in the direction of width of the lamination film 1B in order to correct or project the lamination film 1B in a suitable direction.

Further, the invention is applicable to the case where the thin-film correcting units 19 or thin-film projecting units 20 may be composed of a suction pipe extending along the width of the lamination film 1B and having a plurality of suction holes in order to suck the lamination film 1B in a suitable direction that the lamination film 1B can be corrected or projected as described above.

Further, the invention is applicable to the case where the thin-film correcting units 19 or thin-film projecting units 20 may be composed of a projecting member to correct or project the lamination film 1B in such a suitable direction as described above.

Further, the invention is applicable to the case where the thin-film correcting units 19 serve as thin-film projecting unit 20 or to the case where the thin-film projecting units 20 serve as thin-film correcting units 19.

As shown in FIGS. 1 and 2, a substrate guiding member 21 is secured to the apparatus body 7 (or succeeding-stage conveyer 18) between the thermocompression-bonding roller 16(2) placed in the tacking position and the conveyance roller 18A of the succeeding-stage conveyer 18. The substrate guiding member 21 is arranged so that the insulating substrate 11, having the lamination films 1B stuck thereto, can be guided from the thermocompression-bonding lamination position (tacking position) to the position of the conveyance rollers 18A and 18B. For example, the substrate guiding member 21 is composed of a plurality of bar-like portions respectively extending in the direction of conveyance of the insulating substrate 11 and arranged in the direction of conveyance width thereof in the form of a comb. The substrate guiding member 21 can guide the insulating substrate 11 smoothly, because the contacting area between the insulating substrate 11 and the substrate guiding member 21 during the conveyance of the insulating substrate 11 can be reduced to thereby reduce the frictional resistance thereof.

The invention is applicable to the case where the substrate guiding member 21 may have a net-like structure or a plate-like structure.

The method for thermocompression-bonding lamination of the lamination films 1B according to the thin-film coating apparatus of the invention will be described briefly with reference to FIGS. 1 and 2.

First, as shown in FIGS. 1 and 2, the feeding-direction forward ends of the laminations 1B separated by the thin-film separating rollers 3 are respectively arranged between the sub-vacuum plate 13 and the cutter 14 by handwork.

Next, the forward ends of the lamination films 1B are retained by the sub-vacuum plates 13. After the retention of the lamination films 1B, the sub-vacuum plates 13 are moved respectively to a position far from the feeding path of the lamination film 1B by the driving sources 13A so that the forward ends of the lamination films are attached to the tacking portions 10E. At the same time the absorbing operation of the tacking portions 10E of the main vacuum plates 10 is carried out, the laminations 1B can be corrected by the thin-film correcting units 19. Accordingly, the forward ends of the laminations 1B can be securely absorbed to the tacking portions 10E. When, for example, a continuous operation is made, the forward ends of the laminations 1B cut by the cutters 14 are absorbed to the tacking portions 10E.

Next, the insulating substrate 11 is conveyed by the conveyance rollers 17A and 17B of the preceding-stage conveyer 17. Before the substrate 11 reaches the tacking position, water is applied to the surfaces of the substrate 11 by the wet rollers 31.

Thereafter, when the conveyance-direction forward end portion of the insulating substrate 11 passes through the detecting device for detecting the forward end portion of the substrate, the sensor S1 detects the position. The detection signal from the sensor S1 is fed to the CPU to thereby operate one preset counter. The preset counter counts a predetermined amount of time for stopping the conveyance-direction forward end portion of the insulating substrate 11 in the tacking position.

Further, the detection signal from the sensor S1 operates another preset counter of the CPU. The other preset counter counts a start time for moving the tacking portions 10E near the conveyance path while the conveyance-direction forward end portion of the insulating substrate 11 is conveyed from the position for detecting the forward end of the substrate to the tacking position.

In this condition, the tacking portions 10E (main vacuum plates 10) are respectively placed in the position for starting the tacking operation, whereas the thermocompression-bonding rollers 16 are arranged in the standby position. The position for starting the tacking operation is a position where the driving source 12D operates to move the main vacuum plates 10 in the condition that the upper-side and lower-side supporting members 12 stop at the nearest points to the substrate-conveyance path.

Next, the approaching operation of the tacking portions 10E begins while the conveyance-direction forward end portion of the insulating substrate 11 is conveyed from the position for detecting the forward end of the substrate to the tacking position. The approaching operation of the tacking portions 10E can be started by the driving source 12D controlled by the CPU based on the output signal of the other preset counter.

Next, when the conveyance-direction forward end of the insulating substrate 11 reaches the tacking position based on the output signal of the aforementioned preset counter, the conveyance of the insulating substrate 11 stops. At substantially the same time that the insulating substrate 11 stops, or slightly thereafter, the tacking portions 10E come in contact with the electrically conductive layers of the conveyance-direction forward end portion of the insulating substrate 11 so that the forward ends of the lamination films 1B absorbed to the tacking portions 10E are temporarily adhered to the substrate.

As described above, in the method of adhering the lamination films 1B, the conveyance-direction forward end portion of the insulating substrate 11 is detected at the position for detecting the forward end of the substrate before being conveyed to the tacking position. The conveyance of the insulating substrate 11 is stopped based on the detection signal after the conveyance-direction forward end portion of the insulating substrate 11 is conveyed from the position for detecting the forward end of the substrate to the tacking position. Simultaneously, the tacking portions 10E are moved near the substrate-conveyance path while the conveyance-direction forward end portion of the insulating substrate 11 is conveyed from the position for detecting the forward end of the substrate to the tacking position. After the conveyance-direction forward end portion of the insulating substrate 11 is stopped in the tacking position, the feeding-direction forward ends of the lamination films 1B are tacked onto the electrically conductive layers of the insulating substrate 11 by the tacking portions 10E. Accordingly, a portion of the time required for moving the tacking portions 10E near the conveyance path can be incorporated in the time required for conveying the conveyance-direction forward end portion of the insulating substrate 11 from the position for detecting the forward end of the substrate to the tacking position. Further, since the time required for moving the tacking portions 10E near the conveyance path (that is, the time required for terminating the tacking operation after the stop of the conveyance-direction forward end portion of the insulating substrate 11 at the tacking position) is shortened, the time required for adhering the lamination films 1B can be shortened.

Consequently, because the number of times of adhering the lamination films 1B per unit time can be increased, the capacity of production as to thin-film coating can be improved.

When tacking portions 10E come in contact with the electrically conductive layers of the conveyance-direction forward end portion of the insulating substrate 11, the driving sources 12D operate. The operation of the driving sources 12D are fed to the CPU by which the tacking operation is preserved for a predetermined time. Then the absorbing operation of the main vacuum plates 10 and tacking portions 10E is stopped, so that the main vacuum plates 10 and tacking portions 10E are removed from the conveyance path by the driving sources 12C and 12D. Particularly, the main vacuum plates 10, tacking portions 10E and sub-vacuum plates 13 are moved farther from the position as shown in FIGS. 1 and 2, by the driving sources 12C and 12D. The distance of the movement is proportional to the amount of the slackened lamination 1B'.

Next, the thermocompression-bonding rollers 16 are moved from the standby position, shown by the dotted line, to the tacking position, shown by the solid line, so that the thermocompression-bonding rollers 16 are brought into contact with the laminations 1B temporarily tacked at the feeding-direction forward ends.

Next, the thermocompression-bonding rollers 16 are rotated while the insulating substrate 11 is nipped therebetween to thereby stick the lamination films 1B to the electrically conductive layers of the insulating substrate 11 by thermocompression-bonding lamination. At this time, the absorbing operation of the main vacuum plates 10, tacking portions 10E and sub-vacuum plates 13 is stopped, so that the lamination films 1B can be automatically fed from the feed rollers 2 to the thermocompression-bonding rollers 16 by the rotational force of the thermocompression-bonding rollers 16 and the nipping force against the insulating substrate 11.

Next, the lamination films 1B are bonded through thermocompression and laminated by a predetermined quantity, so that the conveyance-direction backward end portion of the insulating substrate 11 is detected by the sensor S2 at the position for detecting the backward end of the substrate, as shown in FIG. 1. The detection signal from the sensor S2 for detecting the backward end of the substrate is fed to the CPU so that the absorbing operations of the main vacuum plates 10, sub-vacuum plates 13 and rotary vacuum plates 15 are substantially simultaneously started. Then the supporting members 12 are moved from the farthest position from the substrate-conveyance path by the driving sources 12C, so that the laminations 1B are excessively supplied to the side of the insulating substrate 11 by the main vacuum plates 10. Simultaneously, the feeding-direction backward end portions (cutting position) of the laminations 1B are adjusted to coincide with the cutting position of the cutters 14 at the lower absorptive portions 13B of the sub-vacuum plates 13 as shown in FIG. 2. The supply speed of the lamination films 1B (movement speed of the supporting members 12) is established to be more than the thermocompression-bonding lamination speed (circumferential speed of the thermocompression-bonding rollers 16) of the thermocompression-bonding rollers 16(2).

In this condition, each of the laminations 1B is slackened between the sub-vacuum plate 10 and the rotary vacuum plate 15 to thereby prepare the slack of the lamination 1B'. The feeding-direction opposite ends of the slackened lamination film 1B' can be corrected by the thin-film correcting unit 20 so as to be securely absorbed to the lower absorptive portion 13B of the sub-vacuum plate 13 and the rotary vacuum plate 15.

Next, the feeding-direction backward ends of the lamination films 1B adjusted to coincide with the cutting position of the cutters 14 are cut to a predetermined length corresponding to the size of the insulating substrate 11 by the cutters 14. While the feeding-direction backward ends of the lamination films 1B are bonded through thermocompression and laminated, the thermocompression-bonding rollers 16 are moved in the same direction as the substrate-conveyance direction.

Next, the thermocompression-bonding rollers 16 are moved until the feeding-direction backward ends of the laminations 1B are perfectly bonded through thermocompression and laminated onto the electrically conductive layers of the insulating substrate 11 by the rotary vacuum plates 15, as well as the rollers 16 conveying the insulating substrate 11. The thermocompression-bonding rollers 16 can be moved near the standby position. The rotary vacuum plates 15 rotate at a relatively slightly slow speed compared with the rotational speed of the thermocompression-bonding rollers 16, so that the backward ends of the lamination films 1B are bonded through thermocompression and laminated onto the electrically conductive layers of the insulating substrate 11, respectively. Because a moderate amount of tension can be given to the respective lamination film 1B between the rotary vacuum plate 15 and the thermocompression-bonding roller 16 by rotating the rotary vacuum plates 15 slightly slower than the thermocompression-bonding rollers 16, the thermocompression-bonding lamination can be completed without wrinkling the lamination films 1B.

Next, after the thermocompression-bonding lamination is finished, the thermocompression-bonding rollers 16 are moved from the vicinity of the standby position to the standby position in such a direction that the rollers 16 are departed from the substrate-conveyance path.

Further, the invention is applicable to a thin-film coating apparatus in which, after the insulating substrate 11 as in the aforementioned embodiment is preheated, the lamination films 1B are bonded through thermocompression and laminated onto the insulating substrate 11 by non-thermocompression-bonding rollers.

Further, the invention is applicable to a thin-film coating apparatus for sticking protective films onto a smoothly planed board as a building material.

As described above, according to the present invention, voids can be prevented from occurring on the contacting surface between the electrically conductive layer and the thin film. Accordingly, the adhesion between the electrically conductive layer and the lamination film can be improved. Consequently, reliability on the wiring of the printed circuit board can be improved.

What I claim is:

1. A thin-film coating apparatus in which tack members are moved respectively close to opposite surfaces of a conveyance-direction forward end portion of an insulating substrate to temporarily tack feeding-direction forward end portions of thin films thereto, compression roller are placed against the forward end portions of the tacked thin films in the tacking position after said tack members are respectively removed from the surfaces of the substrate, and said compression rollers are rotated to convey said substrate and stick the thin films to the surfaces of the substrate, characterized in that said apparatus comprises:

wet rollers, each having a longitudinal axis and being arranged at a position prior to the tacking position to which said substrate is to be conveyed, for the purpose of depositing a void preventing agent to said substrate;

void preventing agent supply pipes arranged in parallel to the longitudinal axis of and proximate to said wet rollers;

flexible dams arranged under said void preventing agent supply pipes, one end of each of said dams being in contact with lower portions of each of said pipes, another end of each of said dams being in contact with said wet rollers said dams being operative to contain a pool of agent for uniform application to said rollers;

means for supplying the void preventing agent to said void preventing agent supply pipes; and a plurality of void preventing agent supply holes formed in said void preventing agent supply pipes, said holes being arranged in the longitudinal direction of said pipes, wherein said void preventing agent flows through said supply holes into said flexible dams so as to be uniformly applied to said wet rollers.

2. A thin-film coating apparatus according to claim 1, in which said wet rollers are vertically arranged in a pair.

* * * * *